Aug. 7, 1934.  D. H. STEWART  1,969,484
REVERSIBLE FILM FOR MOTION PICTURE APPARATUS
Filed Aug. 17, 1931  2 Sheets-Sheet 1
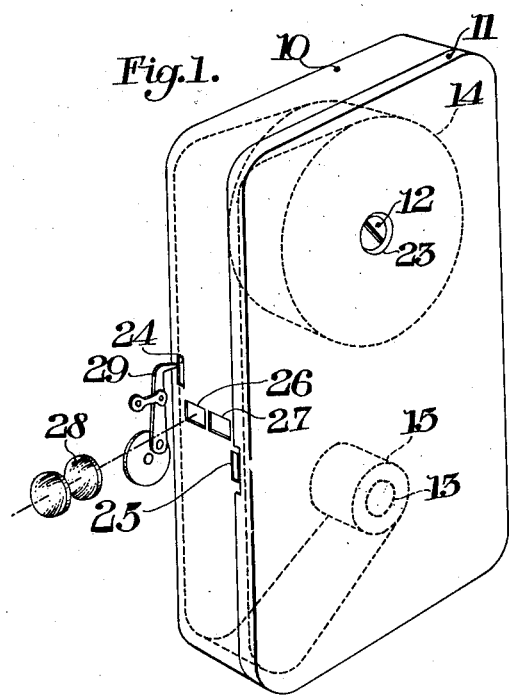
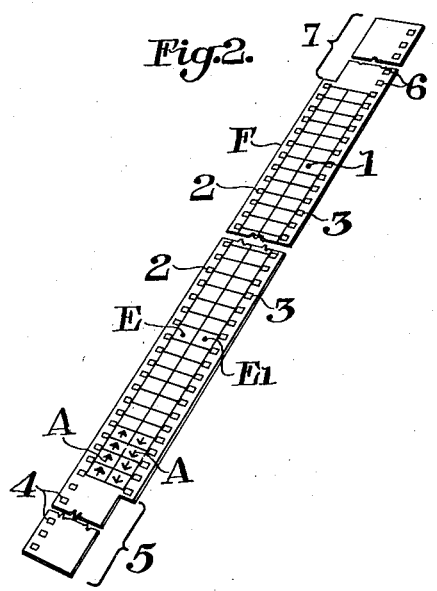
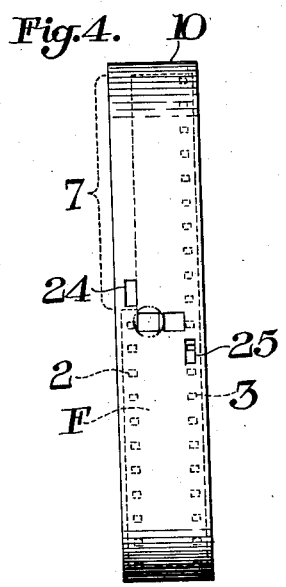
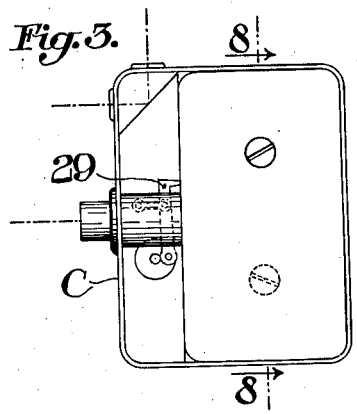
Inventor:
Donald H. Stewart,
By Newton M. Perrins
Attorney.

Aug. 7, 1934.   D. H. STEWART   1,969,484
REVERSIBLE FILM FOR MOTION PICTURE APPARATUS
Filed Aug. 17, 1931   2 Sheets-Sheet 2

Inventor:
Donald H. Stewart,

By Newton M. Perrine
Attorney

Patented Aug. 7, 1934

1,969,484

UNITED STATES PATENT OFFICE 1,969,484

REVERSIBLE FILM FOR MOTION PICTURE APPARATUS

Donald H. Stewart, Rochester, N. Y., assignor to Eastman Kodak Company, Rochester, N. Y., a corporation of New York Application August 17, 1931, Serial No. 557,480

2 Claims. (Cl. 88—16)

This invention relates to photography and more particularly to film or film packages particularly adapted for use in motion picture apparatus in which the film is run through in first one direction and then in the other. One object of my invention is to provide such a film in which the liability of an operator running the film through the motion picture apparatus over the same path twice is reduced to a minimum. Another object of my invention is to provide motion picture apparatus with a pulldown claw adapted to engage only one of two rows of apertures in a film band and provide definitely spaced interruptions which will prevent the pulldown claw from engaging the same row of apertures which has been used to move the film through motion picture apparatus in one direction. Another object of my invention is to provide a film strip having two rows of similarly spaced apertures throughout the major portion of the film, there being only a single row of apertures toward each end thereof, the single row of apertures being spaced on opposite sides of the film. Other objects will appear from the following specification, the novel features being particularly pointed out in the claims at the end thereof.

Coming now to the drawings wherein like characters denote like parts throughout:

Fig. 1 is a perspective view of a reversible film magazine with a schematic showing of the film exposing and moving mechanism constructed in accordance with and embodying a preferred form of my invention;

Fig. 2 is a perspective view of a film band adapted to be used in the magazine shown in Fig. 1;

Fig. 3 is a side elevation of a camera with the cover removed which is adapted for use with the magazine of Fig. 1 and the film of Fig. 2;

Fig. 4 is a front plan view of the magazine shown in Fig. 1 after the film has been run through in one direction;

Figure 5:
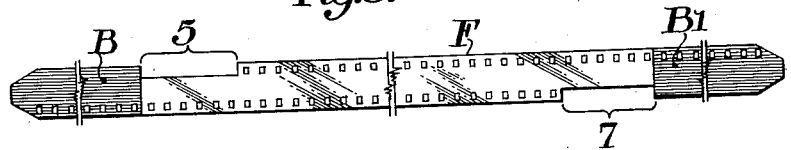
Figs. 5, 6 and 7 are all plan views of film bands which may be used with slightly different embodiments of my invention.

Broadly speaking my invention comprises providing a film with two rows of apertures arranged in parallel relation and with the apertures equally spaced except at the ends of the film band where one row of apertures on each side is eliminated either by failing to perforate the apertures or by cutting away that portion of the film band which would ordinarily contain the apertures.

When a magazine or when a film on spools constructed in accordance with my invention is placed in motion picture apparatus only a single row of perforations may be employed to move the film by a single pulldown claw. This claw may move the film in one direction through the motion picture apparatus. When the claw reaches the interrupted area of the perforations on one side of the film it will naturally cease to move. The film band is then placed in the camera in a reverse direction with the pulldown claw in the opposite row of apertures so that the film may be moved in a reverse direction.

With the interrupted apertures on each side of the film, after the film has been run through the camera and taken out again, if placed in the camera with the same side of the film toward the pulldown mechanism the apertures are not accessible to the claw and consequently the film cannot again be moved in the same direction so that with the arrangement of apertures which will be hereinafter more fully described, the film must be reversed before it can be again run through the machine.

In referring to the film band in this specification I am referring to the strip which may consist solely of photographic film perforated along the edges as indicated in Fig. 2, or to the photographic film band which may consist of film which is connected at one or both ends to a protective covering such as is commonly made of paper. Obviously it is immaterial what type of film band is used.

Referring particularly to Fig. 1, wherein a preferred embodiment of my invention is shown, a suitable magazine may comprise a casing 10 which is equipped with the usual removable cover 11 and is provided with a pair of trunnions 12 and 13 on which a supply coil 14 of film is mounted and a take-up coil 15 is also mounted.

Figure 8:
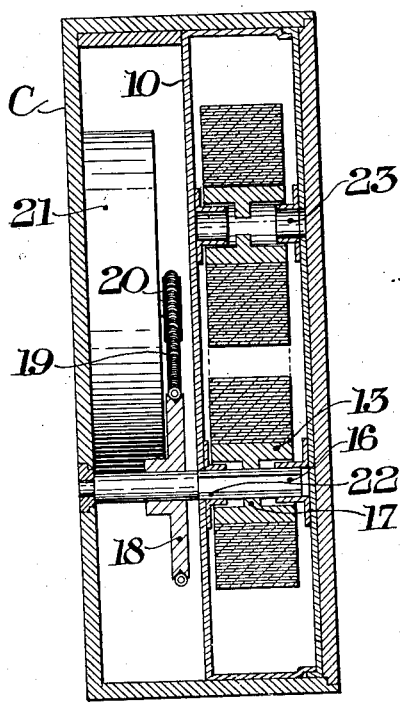
Fig. 8 is a section through the camera shown in Fig. 3 on a somewhat enlarged scale.

As best shown in Fig. 8 this magazine is reversible and when in position in a camera C the take-up trunnion 13 may be power driven by a polygonal shaft 16 which engages a complementary member 17 on the trunnion 13. The polygonal shaft 16 may be driven through a pulley 18 by means of a belt 19 from a pulley 20 which may be operated by a spring motor 21.

As also best shown in Fig. 8 the magazine 10 is provided with apertures 22 and 23. These apertures are provided on opposite sides of the magazine so that only one at a time may be positioned to engage the take-up driving shaft 16.

In Fig. 1 slots 24 and 25 are shown as being symmetrically arranged on opposite sides of the apertures 26 and 27 through which the film is exposed by light rays passing an objective shown diagrammatically at 28.

A pulldown claw 29 of any usual type is provided and this pulldown claw engages only a single aperture of the film at one time. Thus in moving the film in one direction through the camera one row of apertures is used and in moving the film through the camera in an opposite direction the other row of apertures is used.

In the film F shown in Fig. 2 there are two rows of apertures 2 and 3 which are equally spaced and lie opposite each other throughout the major portion of the film. Apertures 2, however, continue further toward one end of the film than apertures 3. These are interrupted at one end shown as 5. Apertures 2 continue as apertures 4 in a single row. Similarly at the opposite end over an area 7 apertures 3 continue as a single row of apertures 6. The reason for this spacing is as follows: With the parts positioned as in Fig. 1 the machine is started and the film is run through the apertures by means of the pulldown claw engaging apertures 2 of the film F. When the area 7 of the film is reached apertures opposite apertures 6 are no longer available for the pulldown claw 29 and the film will stop in the magazine in the position shown in Fig. 4 wherein the apertures have been moved away from registration with the slot 24 through which the pulldown claw 29 operates.

If the magazine is then taken out of the camera C the operator may leave it out for some time and intending to expose the opposite side of the film he may again place the magazine in the camera but because the magazine is symmetrical and can be placed in the camera in either of two directions the operator may be uncertain as to what side has been exposed. If the magazine should be inserted in the camera with the exposed side in the position shown in Fig. 4 the pulldown claw cannot engage and move the film and consequently no harm will result. It is then only necessary to remove the magazine and insert it in an opposite direction to properly engage the pulldown claw 29 with the apertures 3 of the film so that the film may be moved in an opposite direction through the camera.

This film is particularly adapted for apparatus in which two parallel rows of picture areas E and E' as shown in Fig. 2 are formed on the film. One of these runs in one direction and the other in an opposite direction as indicated by the arrows A.

It is customary in film magazines to use a strip of film as indicated at Fig. 2 without any leader strips whatsoever attaching the ends of the film directly to the spools or trunnions on which the coils are formed. However, it would be equally possible to use a film strip F with the backing paper B and B' as indicated in Fig. 5 if it is desirable to save film in magazines or if it is desirable to spool the film as is shown in Fig. 9.

Figure 6:
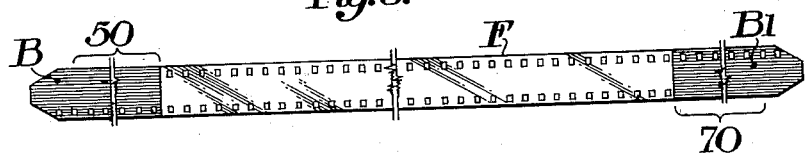
Figure 7:
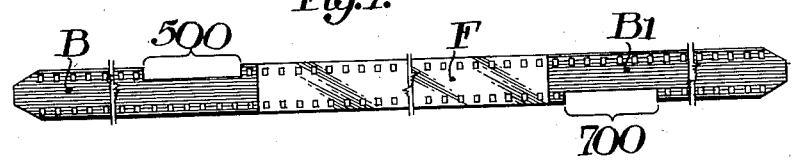

As shown in Fig. 5 the interrupted areas 5 and 7 may occur in the ends of the film F or as indicated in Fig. 6 the interruptions 50 and 70 may be made by failing to perforate a portion of the film band or as shown in Fig. 7 the interruption 500 or 700 may be made by cutting away a portion of the film protective material B or B'. In other words, it is immaterial in just what manner the film band may be formed so long as the apertures are rendered in accessible to the pulldown claw after a certain area of the film has been moved through the machine.

Figure 9:
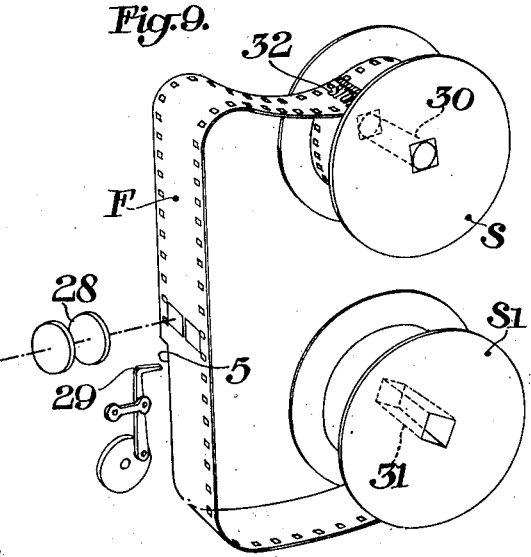
Fig. 9 is a schematic showing of my invention as applied to a camera employing film mounted on film spools instead of film in a magazine.

If film is to be spooled on spools S and S' as shown in Fig. 9 the supply spool S may be mounted upon a round shaft 30 and the take-up spool S' may engage a polygonal shaft 31. Reels with square holes in both flanges are well known in the motion picture art.

It is also customary with film spooled on reels to provide a warning or a signal such as the word "Stop" indicated at 32 on the film band F and in loading cameras the film is usually drawn out until the signal appears. When this has been done, to thread a machine in accordance with my invention, if the film is placed in the camera incorrectly the interrupted part of the aperture 5 will lie in the path of the pulldown claw 29 in such a manner that the claw cannot engage an aperture and consequently cannot move the film. This will immediately warn an operator that the film has been exposed along the side in front of the exposure aperture and the reels can be removed and the film reversed so that the apertures on the opposite side of the film will lie in a position which is accessible to the pulldown claw. Obviously since the spools S and S' can be placed in the camera in either of two positions some such form of mechanism is necessary to prevent the film from being twice run through the camera with the same side of the film in position for exposure.

While I have described preferred embodiments of my invention obviously it is also susceptible of other embodiments so I contemplate as within the scope of my invention all such forms as may come within the scope of the appended claims.

Having thus described my invention, what I claim as new and desire to secure by Letters Patent is:

1. In a reversible magazine for motion picture apparatus, the combination with a film container having a pair of spaced parallel slots longitudinally displaced with respect to each other, a window for exposing film in the magazine, of a film adapted to be moved past the window and having two rows of apertures, one row being displaced longitudinally of the film with respect to the other row, whereby only one row of apertures may register with the said slots when an end of the film lies near the exposure window.

2. In a reversible film magazine for motion picture apparatus the combination with a film container having a pair of spaced and longitudinally displaced slots and a window for exposing film therein, of a film adapted to be moved past the window and having two longitudinal rows of apertures therein, said rows of apertures lying in longitudinally displaced relation whereby only one row of apertures may register with said slots toward the end of the film.

DONALD H. STEWART.